United States Patent [19]
Yasuhara et al.

[11] Patent Number: 4,937,151
[45] Date of Patent: Jun. 26, 1990

[54] COATING COMPOSITION WITH VINYL CHLORIDE POLYMER FOR MAGNETIC RECORDING MEDIUM

[75] Inventors: Yoshiyuki Yasuhara; Tateo Ishida, both of Fukui, Japan

[73] Assignee: Nissin Chemical Industry Co., Ltd., Fukui, Japan

[21] Appl. No.: 227,823

[22] Filed: Aug. 3, 1988

[30] Foreign Application Priority Data

Aug. 6, 1987 [JP] Japan ................................ 62-196649

[51] Int. Cl.$^5$ ................................ G11B 5/70
[52] U.S. Cl. .................... 428/694; 428/900; 524/431; 524/435
[58] Field of Search ............. 524/431, 440, 547, 507; 428/694, 900

[56] References Cited

U.S. PATENT DOCUMENTS

| | | | |
|---|---|---|---|
| 4,818,606 | 4/1989 | Koyama | 428/323 |
| 4,828,924 | 5/1989 | Shoji | 428/422 |
| 4,828,925 | 5/1989 | Miyake | 428/425.9 |

Primary Examiner—Christopher Henderson
Attorney, Agent, or Firm—McAulay Fisher Nissen & Goldberg

[57] ABSTRACT

The invention provides a coating composition used for forming a magnetic layer on the surface of substrates to prepare magnetic recording media, e.g., recording tapes, of which the characteristic ingredient is a novel copolymeric resin. The copolymeric resin is a partial or complete saponification product of a copolymer obtained by the copolymerization of 4 types of comonomers in a spe-cified proportion including (1) vinyl chloride, (2) vinyl acetate, (3) a monomer having an ethylenically unsaturated polymerizable group and an epoxy group in the same molecule and (4) a monomer having an ethylenically unsaturated polymerizable group in the form of a sulfonic acid or a metal salt thereof. The vinyl acetate moiety is converted into a vinyl alcohol moiety partially or completely by the saponification. This copolymeric resin is advantageous in respect of the dispersibility of the ferromagnetic particles and the high crosslinkability which serves to improve the durability of the magnetic recording medium prepared by using the resin.

5 Claims, 2 Drawing Sheets

FIG. I

COATING COMPOSITION WITH VINYL CHLORIDE POLYMER FOR MAGNETIC RECORDING MEDIUM

BACKGROUND OF THE INVENTION

The present invention relates to a novel coating composition used for forming a magnetic layer on a magnetic recording medium or, in particular, to a novel resin used as a binder ingredient in the coating composition capable of uniformly dispersing and suitable for binding particles of ferromagnetic materials.

Magnetic recording media such as magnetic recording tapes and the like usually have a structure that a base film or sheet such as polyester films is provided on one surface with a magnetic coating layer composed of particles of a ferromagnetic material and a resinous ingredient as a binder of the particles or a matrix of the layer. Various kinds of magnetic materials are used for the purpose including iron oxides of the formulas $\gamma$-$Fe_2O_3$ and $Fe_3O_4$ undoped or doped with cobalt ions adsorbed on the particles thereof, and chromium oxide of the formula $CrO_2$ as well as powders of metals such as iron and cobalt and alloys such as those of iron and cobalt optionally containing nickel having a needle-like particle configuration. Along with the progress in the technology of magnetic signal recording in recent years for video tapes and audio tapes toward a higher recording density and a higher output in the playing of the tapes prepared by short-wave recording, these magnetic powders are also required to have a finer and finer particle size distribution. One of the difficult problems in the preparation of a coating composition for magnetic recording media is that, due to the very large magnetic moment of such fine magnetic particles, the particles sometimes form agglomerates so that a great difficulty is encountered in obtaining the desirable uniform distribution of the individual magnetic particles in the matrix resin.

With an object to solve the above mentioned technical problem, extensive investigations have been undertaken to improve the affinity of the matrix resin with the magnetic particles. For example, a proposal has been made to use a vinyl chloride-based copolymeric resin having polar groups such as carboxyl and hydroxy groups introduced into the molecular structure. The resins of this type are still not quite satisfactory in respect of the dispersibility of ferromagnetic particles therein so that the magnetic recording media prepared with the resin as a binder of the ferromagnetic particles are inferior in the magnetic properties such as the residual magnetic flux and squareness ratio of the magnetic hysteresis loop and sometimes cause falling of the magnetic particles to have a greatly decreased durability in service. See, for example, Japanese Patent Publication Nos. 55-34493, 55-35768 and 56-12934 for the carboxyl-containing resins and Japanese Patent Publication Nos. 55-28130, 55-43189 and 55-35770 for the hydroxy-containing resins.

SUMMARY OF THE INVENTION

The present invention accordingly has an object to provide a novel polymeric resin suitable for uniformly dispersing and firmly binding fine particles of a ferromagnetic material in a magnetic coating composition without the above described problems and disadvantages in the prior art polymeric resins.

The invention also has an object to provide a novel coating composition for forming magnetic layers on the surface of base films by using the above mentioned resin as a binder of the ferromagnetic particles.

Thus, the novel polymeric resin provided by the present invention as a binder of ferromagnetic particles in a coating composition for magnetic recording media is a copolymeric resin having hydroxy groups directly bonded to the carbon atoms of the polymeric molecular chain, which is a saponification product of a copolymer formed by the copolymerization of a monomeric mixture comprising (1) vinyl chloride, (2) vinyl acetate, (3) a monomer having an ethylenically unsaturated polymerizable group and an epoxy group in the same molecule and (4) a monomer having an ethylenically unsaturated polymerizable group in the form of a sulfonic acid or a metal salt thereof.

Thus, the copolymeric resin is composed of four or five types of monomeric moieties including (a) a first monomeric moiety of vinyl chloride of the formula $-CH_2-CHCl-$, (b) a second monomeric moiety of vinyl alcohol of the formula $-CH_2-CHOH-$, (c) a third monomeric moiety having an epoxy group, (d) a fourth monomeric moiety having a sulfonic acid group $-SO_3H$ or a metal salt thereof, and, when the copolymeric resin is a partial saponification product of a copolymer of the above mentioned four kinds of monomers (1) to (4), (e) a fifth monomeric moiety of vinyl acetate of the formula $-CH_2-CH(O-CO-CH_3)-$. The weight fractions of these five types of monomeric moieties are, preferably, from 65 to 95% for (a), from 3 to 15% for (b), from 1 to 10% for (c), from 0.1 to 5% for (d) and, if any, up to 5% for (e).

It is also preferable that the copolymer has an average degree of polymerization in the range from 200 to 800.

The coating composition for a magnetic layer of a magnetic recording medium provided by the invention accordingly comprises, as dissolved or dispersed in an organic solvent:

(A) a polymeric resin as defined above; and
(B) particles of a ferromagnetic material dispersed in the polymeric resin as a vehicle.

DETAILED DESCRIPTION OF THE PREFERRED EMBODIMENTS

Figure 1:
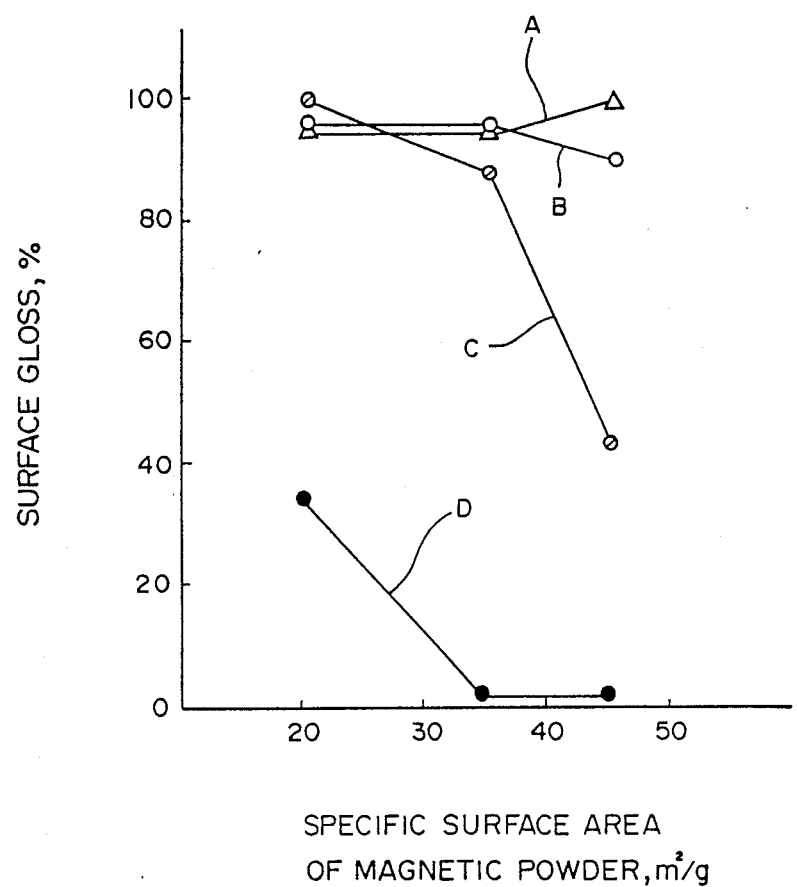
FIG. 1 shows the surface gloss of the magnetic recording media prepared in Examples 1 (curve A) and 2 (curve B) and Comparative Examples 1 (curve C) and 2 (curve D) as a function of the specific surface area of the ferromagnetic powder.

As is described above, the polymeric resin of the invention is a complete or partial saponification product of a quaternary copolymer prepared by the copolymerization of the four comonomers (1) to (4) defined above so that the polymeric resin is composed of four or five types of the monomeric moieties. This polymeric resin is very advantageous as a matrix of the magnetic coating layer in respect of the high dispersibility of the ferromagnetic particles therein as well as high loadability with the ferromagnetic powder. In addition, the polymeric resin is fully compatible with polyurethane resins and the like conventionally used as a matrix resin of magnetic coating layers so that the coating composition of the invention can be prepared by using not only the above defined polymeric resin alone but also by the combined use thereof with other conventional resins with an object to improve the properties of the latter. Further, the coating composition of the invention can provide a magnetic coating layer having excellent characteristics both in the magnetic properties and the serviceability relative to the durability in service and thermal stability of the properties in the lapse of time.

The polymeric resin of the invention is obtained by copolymerizing the above described four types of monomers (1) to (4) in admixture to give a copolymer having an average degree of polymerization of 200 to 800 and then completely or partially saponifying the copolymer. As a result, the polymeric resin is composed of four or five types of the monomeric moieties including:

(a) from 65 to 95% by weight of a first monomeric moiety of vinyl chloride of the formula $-CH_2-CHCl-$;

(b) from 3 to 15% by weight of a second monomeric moiety of vinyl alcohol of the formula $-CH_2-CHOH-$;

(c) from 1 to 10% by weight of a third monomeric moiety having an epoxy group;

(d) from 0.1 to 5% by weight of a fourth monomeric moiety having a sulfonic acid group $-SO_3H$ or a metal salt thereof;

and, when the copolymeric resin is a partial saponification product of a copolymer of the four kinds of monomers, (e) up to 5% by weight of a fifth monomeric moiety of vinyl acetate of the formula $-CH_2-CH(O-CO-CH_3)-$.

The weight fraction of the first monomeric moiety, i.e. the moiety derived from vinyl chloride, should be in the range from 65 to 95% by weight. When the weight fraction of this monomeric moiety is too low, the coating layer formed from the coating composition may be somewhat poor in the mechanical properties. When the weight fraction thereof is too high, a difficulty is encountered in the preparation of the coating composition due to the decreased solubility of the polymeric resin in organic solvents.

The weight fractions of the second and the fifth monomeric moieties are interrelated to each other because both of these monomeric moieties are derived from vinyl acetate as one of the comonomers. Namely, the moiety of vinyl alcohol is formed by the saponification of the vinyl acetate moiety so that the relative weight fractions of these monomeric moieties depend on the completeness of the saponification reaction. The weight fraction of the vinyl acetate moiety should not exceed 5% in order to avoid relative decrease in the weight fractions of the other monomeric moieties. The weight fraction of the second, i.e. vinyl alcohol, monomeric moiety should be in the range from 3 to 15%. When the weight fraction thereof is too small, disadvantages are caused in the decreased dispersibility of the ferromagnetic particles in the matrix resin and also in the compatibility of the polymeric resin with other resinous ingredients such as a polyurethane resin used in combination according to need and decreased reactivity with an isocyanate prepolymer due to the decrease in the hydroxy content resulting in a decrease in the gel fraction of the resinous ingredients in the coating composition. When the weight fraction of the vinyl alcohol moiety is too large, on the other hand, a decrease is caused in the mechanical strengths and thermal stability of the coating layer formed from the coating composition affecting the durability of the magnetic recording medium prepared therewith.

The third monomeric moiety, i.e. the moiety having an epoxy group, can be introduced into the polymeric resin by the copolymerization of a monomer having an ethylenically unsaturated polymerizable group and an epoxy group in the same molecule with the other comonomers. Examples of such a monomer include glycidyl methacrylate, glycidyl acrylate, glycidyl crotonate, 2-methylglycidyl methacrylate, diglycidyl fumarate, allyl glycidyl ether, methallyl glycidyl ether, allyl 2-methylglycidyl ether and the like. The monomeric moiety of this type has an effect to improve the thermal stability of the polymeric resin. In this regard, the weight fraction thereof should be at least 1% while a further increase in the weight fraction thereof over 10% has no particular additional advantageous effect on the thermal stability.

The fourth monomeric moiety has sulfonic acid group either in the free acid form or in the salt form with a metallic element. This monomeric moiety contributes to increase the dispersibility of the ferromagnetic particles in the coating composition. In this regard, the weight fraction thereof should be at least 0.1% although an excessively large weight fraction thereof over 5% has no particularly advantageous effect. The monomeric moiety of this type is introduced into the polymeric resin by the copolymerization of a monomer having an ethylenically unsaturated polymerizable group and a sulfonic acid group $-SO_3X$, in which X is a hydrogen atom or an atom of a metal such as alkali metals. Examples of suitable monomer include those expressed by the following structural formulas, in which X is an atom of hydrogen or an alkali metal, e.g., sodium and potassium, and R is an alkyl group having 8 to 18 carbon atoms: $CH_2=CH-SO_3X$; $CH_2=CH-CH_2-SO_3X$; $CH_2=CH-C_6H_4-SO_3X$; $CH_2=C(CH_3)-CH_2-SO_3X$; $CH_2=CH-CO-NH-C(CH_3)_2(CH_2-SO_3X)$; $CH_2=CH-CO-O-C_4H_8-SO_3X$; $CH_2=CH-CH_2-O-CO-CH(CH_2-CO-OR)-SO_3X$; $CH_2=C(CH_3)-CO-O-C_2H_4-SO_3X$ and the like.

The copolymeric resin obtained by the copolymerization of the above described four types of the comonomers followed by partial or complete saponification should preferably have an average degree of polymerization in the range from 200 to 800. When the average degree of polymerization thereof is too small, no sufficiently high mechanical strengths as well as durability can be imparted to the magnetic recording media having the magnetic coating layer of the composition formulated with the copolymer. When the average degree of polymerization thereof is too large, the coating composition formulated with the copolymer in a desired concentration may have an increased viscosity to badly affect the workability with the coating composition.

The copolymerization reaction of the four types of the comonomers can be performed by any known method including the methods of suspension polymerization, emulsion polymerization, solution polymerization, precipitation polymerization, bulk polymerization and the like. The vinyl alcohol moiety in the copolymer can be introduced by the copolymerization of a monomer mixture including vinyl acetate, which can be replaced with vinyl propionate or other vinyl ester of a lower carboxylic acid, if so desired, followed by saponification of the copolymer by use of an alkali, e.g., potassium hydroxide, sodium hydroxide and sodium al-coholate, or an acid, e.g., hydrochloric acid, as a catalyst followed by purification in a conventional manner.

In the preparation of a magnetic coating composition by using the above described specific copolymer as a vehicle of the ferromagnetic particles, the copolymeric resin can be used in combination with other polymeric resins conventionally used in the manufacture of magnetic recording media in a minor, e.g., 50% by weight or smaller, amount. Examples of polymeric resins suitable for such a combined use include polyurethane resins, nitrocelluloses, epoxy resins, polyamide resins and phenolic resins as well as polymers and copolymers of acrylic and methacrylic acid esters, styrene, acrylonitrile, butadiene, ethylene, propylene, vinylidene chloride, acrylamide, vinyl ehters and the like, of which polyurethane resins and nitrocelluloses are particularly preferable.

The coating composition of the invention should further be compounded with an isocyanate-based compound as a curing agent to react with the hydroxy groups. Examples of the isocyanatebased curing agent include difunctional isocyanate compounds such as tolylene diisocyanates, diphenyl methane diisocyanate, hexane diisocyanate and the like, trifucntional isocyanate compounds sold under the trade names of Coronate L (a product by Nippon Polyurethane Kogyo Co.), Desmodur L (a product by Bayer Co.) and the like and urethane prepolymers having isocyanate groups at both molecular chain ends. The amount of these polyisocyanate-based curing agent in the magnetic coating composition of the invention should be sufficient to cure the copolymeric resin as the vehicle but should not exceed 40 parts by weight per 100 parts by weight of the copolymeric resin.

The type of the ferromagnetic powder dispersed in the above described resinous ingredient as the vehicle is not particularly limitative including various kinds of known ones such as $\gamma$-$Fe_2O_3$ and $Fe_3O_4$ undoped or doped with cobalt ions, $CrO_2$ and powders of metals, e.g., iron and cobalt, and alloys, e.g., iron-cobalt alloys, optionally, containing nickel and having a needle-like particle configuration. The amount of the copolymeric resin as the vehicle in the inventive coating composition should be at least 8 parts by weight in order to obtain full binding effect of the particles but should not exceed 30 parts by weight per 100 parts by weight of the ferromagnetic powder. It is of course optional that the magnetic coating composition of the invention, which is basically a uniform dispersion of the ferromagnetic particles in the polymeric resin as the vehicle, is further admixed with various kinds of known additives conventionally used in magnetic coating compositions including lubricating agents, abrasive powders, antistatic agents, dispersion aids, rust inhibitors and the like each in a limited amountIt is of course that the composition is diluted with an organic solvent to be imparted with an adequate viscosity or consistency suitable for the coating works. Examples of suitable organic solvents include methyl ethyl ketone, methyl isobutyl ketone, toluene and the like.

The inventive magnetic coating composition prepared in the above described manner can be applied to the surface of a substrate in the form of films, tapes, sheets, foils, plates and the like of various kinds of materials without particular limitations including synthetic resins such as polyesters, polyolefins, cellulose acetates, polycarbonates and the like, non-magnetic metals such as aluminum and ceramics. The coating works with the inventive magnetic coating composition can be performed by any known methods conventionally used in the manufacture of magnetic recording media followed by a surface treatment such as calendering to improve the smoothness of the coated surface required for a high-performance magnetic recording medium.

In the following, the present invention is described in more detail by way of examples which show the preparation of the copolymeric resins and the application thereof to the manufacture of magnetic recording media.

EXAMPLE 1

Into an autoclave equipped with a stirrer after flushing with nitrogen gas were introduced 963 g of vinyl chloride, 173 g of vinyl acetate, 48 g of allyl glycidyl ether, 16 g of an aqueous solution of sodium vinylsulfonate in a concentration of 30%, 2220 g of deionized water, 24 g of sodium laurate (Emal O, a product by Kao Co.), 48 g of polyoxyethylene octylphenyl ether (Octapol 400, a product by Sanyo Kasei Co.), 24 g of trichloroethylene, 6 g of sodium carbonate and 24 g of potassium persulfate to form a polymerization mixture which was heated under agitation at 60° C. for 7 hours to effect the copolymerization reaction.

When the pressure inside the autoclave had dropped to 0.5 kg/cm$^2$G, the pressure was released and the polymerization mixture in the autoclave was cooled to room temperature. The thus obtained emulsion was admixed with 3500 g of methyl alcohol and agitated for 1 hour at 60° C. followed by cooling to give a slurry of the copolymeric resin. The copolymer slurry taken out of the autoclave was filtered to collect the copolymeric resin which was washed three times each with 3500 ml of deionized water and dried to give 1105 g of the copolymeric resin in the form of a dry powder. The copolymeric resin had an average degree of polymerization of about 300. Analysis of the copolymeric resin indicated that the copolymer was composed of 85.2% by weight of the vinyl chloride moiety, 11.6% by weight of the vinyl acetate moiety, 2.7% by weight of the allyl glycidyl ether moiety and 0.5% by weight of the sodium vinylsulfonate moiety.

The above obtained copolymer was subjected to a saponification reaction in the following manner. Thus, 500 g of the copolymeric resin were introduced into a flask equipped with a reflux condenser together with 700 g of methyl alcohol, 300 g of acetone and 17.5 g of sodium hydroxide and the mixture was agitated for 5 hours at 50° C. to effect the saponification reaction followed by cooling to room temperature. Thereafter, the mixture was admixed with 35 g of acetic acid to neutralize the free sodium hydroxide and washed four times each time with 1000 g of methyl alcohol and then twice each time with 1000 g of deionized water followed by drying to give 430 g of a saponified pcoolymer in the form of a dry powder, which is referred to as the Polymer I hereinbelow. The Polymer I had an average degree of polymerization of about 290. Analysis of the Polymer I indicated that the copolymeric resin was composed of 90.4% by weight of the vinyl chloride moiety, 1.0% by weight of the vinyl acetate moiety, 5.6% by weight of the vinyl alcohol moiety, 2.7% by weight of the allyl glycidyl ether moiety and 0.3% by weight of the sodium vinylsulfonate moiety.

EXAMPLE 2

Into an autoclave equipped with a stirrer after flushing with nitrogen gas were introduced 480 g of vinyl chloride, 180 g of vinyl acetate, 48 g of allyl glycidyl ether, 6 g of sodium methallylsulfonate, 2220 g of deionized water, 24 g of sodium laurate (Emal O, supra), 48 g of polyoxyethylene octylphenyl ether (Octapol 400, supra), 24 g of trichloroethylene, 6 g of sodium carbonate and 24 g of potassium persulfate to form a polymerization mixture which was heated under agitation at 60° C. to start the copolymerization reaction and then an additional portion of 480 g of vinyl chloride was continuously introduced into the autoclave under pressurization taking 8 hours to effect the copolymerization reaction.

When the pressure inside the autoclave had dropped to 0.5 kg/cm²G after 1 to 2 hours from completion of the pressurized introduction of vinyl chloride, the pressure was released and the polymerization mixture in the autoclave was cooled to room temperature. The thus obtained emulsion was admixed with 3500 g of methyl alcohol and agitated for 1 hour at 60° C. followed by cooling to give a slurry of the copolymeric resin. The copolymerizate slurry taken out of the autoclave was filtered to collect the copolymer which was washed three times each time with 3500 ml of deionized water and dried to give 1134 g of the copolymeric resin in the form of a dry powder. The copolymer had an average degree of polymerization of about 280. Analysis of the copolymeric resin indicated that the copolymer was composed of 86.3% by weight of the vinyl chloride moiety, 9.7% by weight of the vinyl acetate moiety, 3.6% by weight of the allyl glycidyl ether moiety and 0.5% by weight of the sodium methallylsulfonate moiety.

The above obtained copolymer was subjected to a saponification reaction in the following manner. Thus, 500 g of the copolymer were introduced into a flask equipped with a reflux condenser together with 700 g of methyl alcohol, 300 g of benzene and 17.5 g of sodium hydroxide and the mixture was agitated for 5 hours at 50° C. to effect the saponification reaction followed by cooling to room temperature. Thereafter, the mixture was admixed with 35 g of acetic acid to neutralize the free sodium hydroxide and washed four times each time with 1000 g of methyl alcohol and then twice each time with 1000 g of deionized water followed by drying to give 435 g of a saponified polymer in the form of a dry powder, which is referred to as the Polymer II hereinbelow. The Polymer II had an average degree of polymerization of about 280. Analysis of the copolymeric resin indicated that the copolymeric resin was composed of 90.6% by weight of the vinyl chloride moiety, 1.1% by weight of the vinyl acetate moiety, 4.4% by weight of the vinyl alcohol moiety, 3.6% by weight of the allyl glycidyl ether moiety and 0.3% by weight of the sodium methallylsulfonate moiety.

EXAMPLE 3

The experimental procedure for the copolymerization of a monomer mixture was substantially the same as in Example 1 except that the monomer mixture was composed of 848 g of vinyl chloride, 299 g of vinyl acetate, 24 g of glycidyl methacrylate and 24 g of sodium methacryloxyethyl sulfonate to give 1050 g of a copolymer in the form of a dry powder. The copolymer had an average degree of polymerization of about 320. Analysis of the copolymeric resin indicated that the copolymer was composed of 73.7% by weight of the vinyl chloride moiety, 27.5% by weight of the vinyl acetate moiety, 2.1% by weight of the glycidyl methacrylate moiety and 1.7% by weight of the moiety of sodium methacryloxyethyl sulfonate.

The above obtained copolymer was subjected to a saponification reaction in the following manner. Thus, 500 g of the copolymer were introduced into a flask equipped with a reflux condenser together with 850 g of methyl alcohol, 150 g of benzene and 50 g of sodium hydroxide and the mixture was agitated for 5 hours at 50° C. to effect the saponification reaction followed by cooling to room temperature. Thereafter, the mixture was admixed with 35 g of acetic acid to neutralize the free sodium hydroxide and washed four times each time with 1000 g of methyl alcohol and then twice each time with 1000 g of deionized water followed by drying to give 310 g of a saponified polymer in the form of a dry powder, which is referred to as the Polymer III hereinbelow. The Polymer III had an average degree of polymerization of about 240. Analysis of the Polymer III indicated that the copolymeric resin was composed of 82.6% by weight of the vinyl chloride moiety, 11.5% by weight of the vinyl acetate moiety, 4.4% by weight of the vinyl alcohol moiety, 2.3% by weight of the glycidyl methaqcrylate moiety and 1.4% by weight of the moiety of sodium methacryloxyethyl sulfonate.

EXAMPLE 4

Into an autoclave equipped with a stirrer after flushing with nitrogen gas were introduced 963 g of vinyl chloride, 173 g of vinyl acetate, 48 g of allyl glycidyl ether, 5 g of sodium methacryloxyethyl sulfonate, 2378 g of methyl alcohol and 12 g of di(2-ethylhexyl) peroxy dicarbonate to form a polymerization mixture which was heated under agitation at 40° C. for 9 hours to effect the copolymerization reaction.

When the pressure inside the autoclave had dropped substantially close to the atmospheric pressure, the residual pressure was released and the polymerization mixture in the autoclave was cooled to room temperature. The thus obtained copolymerizate slurry taken out of the autoclave was filtered to collect the copolymer which was washed three times each time with 3500 ml of deionized water and dried to give 773 g of the copolymeric resin in the form of a dry powder. The copolymeric resin had an average degree of polymerization of about 340. Analysis of the copolymeric resin indicated that the copolymer was composed of 83.4% by weight of the vinyl chloride moiety, 12.7% by weight of the vinyl acetate moiety, 3.7% by weight of the allyl glycidyl ether moiety and 0.2% by weight of the moiety of sodium methacryloxyethyl sulfonate.

The above obtained copolymer was subjected to a saponification reaction in the following manner. Thus, 500 g of the copolymer were introduced into a flask equipped with a reflux condenser together with 1500 g of methyl alcohol and 17.5 g of sodium hydroxide and the mixture was agitated for 5 hours at 50° C. to effect the saponification reaction followed by cooling to room temperature. Thereafter, the mixture was admixed with 35 g of acetic acid to neutralize the free sodium hydroxide and washed four times each time with 1500 g of methyl alcohol and then twice each time with 1500 g of deionized water followed by drying to give 450 g of a saponified polymer in the form of a dry powder, which is referred to as the Polymer IV hereinbelow. The Polymer IV had an average degree of polymerization of about 310. Analysis of the Polymer IV indicated that the copolymeric resin was composed of 88.9% by weight of the vinyl chloride moiety, 1.2% by weight of the vinyl acetate moiety, 5.9% by weight of the vinyl alcohol moiety, 3.9% by weight of the allyl glycidyl ether moiety and 0.15% by weight of the moiety of sodium methacryloxyethyl sulfonate.

COMPARATIVE EXAMPLE 1

Into an autoclave equipped with a stirrer after flushing with nitrogen gas were introduced 944 g of vinyl chloride, 12 g of vinyl acetate, 197 g of 2-hydroxyethyl methacrylate, 48 g of allyl glycidyl ether, 8 g of a 30% aqueous solution of sodium vinylsulfonate, 2220 g of deionized water, 24 g of sodium laurate (Emal O, supra), 48 g of polyoxyethylene octylphenyl ether (Octapol 400, supra), 24 g of trichloroethylene, 6 g of sodium carbonate and 24 g of potassium persulfate to form a polymerization mixture which was heated under agitation at 60° C. for 7 hours to effect the copolymerization reaction. When the pressure inside the autoclave had dropped to 0.5 kg/cm$^2$G, the pressure was released and the polymerization mixture in the autoclave was cooled to room temperature. The thus obtained emulsion was admixed with 3500 g of methyl alcohol and agitated for 1 hour at 60° C. followed by cooling to give a slurry of the copolymeric resin. The copolymerizate slurry taken out of the autoclave was filtered to collect the copolymer which was washed three times each time with 3500 ml of deionized water and dried to give 1108 g of the copolymeric resin in the form of a dry powder, which is referred to as the Polymer V hereinbelow. The copolymeric resin had an average degree of polymerization of about 310. Analysis of the Polymer V indicated that the copolymeric resin was composed of 79.3% by weight of the vinyl chloride moiety, 0.7% by weight of the vinyl acetate moiety, 17.3% by weight of the 2-hydroxyethyl methacrylate moiety, 2.5% by weight of the allyl glycidyl ether moiety and 0.2% by weight of the sodium vinylsulfonate moiety.

COMPARATIVE EXAMPLE 2

Into an autoclave equipped with a stirrer after flushing with nitrogen gas were introduced 643 g of vinyl chloride, 225 g of vinyl acetate, 1900 g of deionized water, 30 g of sodium laurate (Emal O, supra), 60 g of polyoxyethylene octylphenyl ether (Octapol 400, supra), 22 g of trichloroethylene, 7.5 g of sodium carbonate and 30 g of potassium persulfate to form a polymerization mixture which was heated under agitation at 60° C. to start the copolymerization reaction and then an additional portion of 643 g of vinyl chloride was continuously introduced into the autoclave under pressurization taking 8 hours to effect the copolymerization reaction.

When the pressure inside the autoclave had dropped to 0.5 kg/cm$^2$G, the pressure was released and the polymerization mixture in the autoclave was cooled to room temperature. The thus obtained emulsion was admixed with 3500 g of methyl alcohol and agitated for 1 hour at 60° C. followed by cooling to give a slurry of the copolymeric resin. The copolymerizate slurry taken out of the autoclave was filtered to collect the copolymer which was washed three times each time with 3500 ml of deionized water and dried to give 1370 g of the copolymeric resin in the form of a dry powder. The copolymer had an average degree of polymerization of about 320. Analysis of the copolymeric resin indicated that the copolymer was composed of 85.9% by weight of the vinyl chloride moiety and 14.1% by weight of the vinyl acetate moiety.

The above obtained copolymer was subjected to a saponification reaction in the following manner. Thus, 500 g of the copolymer were introduced into a flask equipped with a reflux condenser together with 1795 g of methyl alcohol, 305 g of acetone and 17.5 g of sodium hydroxide and the mixture was agitated for 5 hours at 50° C. to effect the saponification reaction followed by cooling to room temperature. Thereafter, the mixture was admixed with 35 g of acetic acid to neutralize the free sodium hydroxide and washed four times each time with 1000 g of methyl alcohol and then twice each time with 1000 g of deionized water followed by drying to give 462 g of a saponified polymer in the form of a dry powder, which is referred to as the Polymer VI hereinbelow. The Polymer VI had an average degree of polymerization of about 320. Analysis of the Polymer VI indicated that the copolymeric resin was composed of 91.8% by weight of the vinyl chloride moiety, 1.7% by weight of the vinyl acetate moiety and 6.5% by weight of the vinyl alcohol moiety.

EXAMPLE 5

Each of the Polymers I to VI prepared in the above described Examples 1 to 4 and Comparative Examples 1 and 2 was subjected to the evaluation of the crosslinkability and thermal stability of the polymer per se and the magnetic properties of the magnetic recording tape manufactured by coating with a coating composition prepared by using the polymeric resin as the vehicle. The results are summarized in the table given below.

The crosslinkability of the Polymers I to VI was evaluated by measuring the gel fraction in the following manner. Thus, 36 g of the polymeric resin were heated in a mixture of 48 g of methyl ethyl ketone and 48 g of methyl isobutyl ketone at 50° C. for 1 hour and dissolved in the solvent mixture followed by cooling to room temperature. The solution was admixed with 7.2 g of an isocyanate compound (Coronate L, supra) and agitated fro 5 minutes. This solution was applied to the surface of a sheet of poly(tetrafluoroethylene) resin in a thickness of 6 mil by using a doctor knife followed by air-drying to give a film of the polymer. After heating at 60° C. for 24 hours, exactly 1 g of the polymer film was taken by accurate weighing and introduced into a volumetric flask of 250 ml capacity into which methyl ethyl ketone was added until the liquid surface reached the indicator line. The volumetric flask was kept standing at room temperature with shaking at intervals. Thereafter, a 25 ml aliquot portion of the supernatant was taken by pipetting and transferred into a weighing bottle, which was heated on a hot water bath to evaporate the solvent in the solution to dryness to determine the weight of the dissolved fraction of the polymer. The gel fraction was given as the weight percentage of the undissolved fraction.

The thermal stability of the Polymers I to VI was evaluated in the following manner. Thus, 1 g portion of the polymeric resin was taken in a test tube of 15 ml capacity which was stoppered with a cotton ball holding a Congo Red test paper hanging in the test tube. The test tube was heated in an oil bath at 120° C. and the time taken for the discoloration of the test paper by the hydrogen chloride gas evolved from the polymeric resin was recorded as a measure of the thermal stability.

Magnetic recording tapes were prepared by using the Polymers I to VI as the binder of a ferromagnetic powder in the following manner. Thus, 7.6 g of the polymeric resin were taken in a flask together with each 10.1 g of toluene, methyl ethyl ketone and methyl isobutyl ketone and dissolved in the solvent mixture by heating at 50° C. for 1 hour. The solution was admixed in a circulation-media mill (Eiger Mill, manufactured by Eiger Engineering Corp.) with 30 g of a ferromagnetic powder and the magnetic powder was uniformly dispersed by blending for 1 hour. Three kinds of ferromagnetic powders were used in the preparation including a $\gamma$-$Fe_2O_3$ powder having a specific surface area of 20 $m^2/g$, referred to as the magnetic powder A hereinbelow, a cobalt-doped $\gamma$-$Fe_2O_3$ powder having a specific surface area of 35 $m^2/g$, referred to as the magnetic powder B hereinbelow, and a cobalt-doped $\gamma$-$Fe_2O_3$ powder having a specific surface area of 45 $m^2/g$, referred to as the magnetic powder C hereinbelow. The mixture was further admixed with 1.8 g of a isocyanate compound (Coronate L, supra) and blended for 30 minutes followed by screening under suction through a filter of 20 $\mu m$ mesh opening to give a magnetic coating composition.

A polyester film having a thickness of 16 $\mu m$ was coated with the magnetic coating composition in a thickness of 6 $\mu m$ as dried and dried after a treatment for magnetic orientation of the ferromagnetic particles. The thus prepared magnetic recording tapes were subjected to the measurement of the surface gloss using a gloss meter (manufactured by Murakami Shikisai Giken Co.) and the magnetic properties including the residual magnetic flux $B_r$ and the squareness ratio using a vibration-type magnetometer (manufactured by Toei Kogyo Co.).

The results obtained in the above described testing are shown in the table below and the accompanying drawing. As is understood from these showings, the magnetic recording tapes prepared by using the Polymers I to IV are remarkably superior in the surface gloss and magnetic properties to those prepared by using the Polymer V or VI prepared in the Comparative Examples. The difference in the magnetic properties of the magnetic recording tapes was particularly remarkable between the inventive and comparative polymers used as the matrix resin of the coating layer when the magnetic powder C having the largest specific surface area was used. FIG. 1 of the accompanying drawing shows the surface gloss of the magnetic recording tapes prepared by using the Polymers I (curve A), II (curve B), V (curve C) and VI (curve D) as a function of the specific surface area of the ferromagnetic powder.

TABLE

| Polymer No. | I | II | III | IV | V | VI |
|---|---|---|---|---|---|---|
| Gel fraction, % | 84 | 65 | 89 | 88 | 56 | 87 |
| Thermal stability, seconds | 1472 | 1701 | 1218 | 1502 | 1595 | 463 |
| Magnetic powder A | | | | | | |
| Surface gloss, % | 95 | 96 | 92 | 94 | 100 | 34 |
| Br, gauss | 1480 | 1480 | 1470 | 1470 | 1440 | 1320 |
| Squarenes ratio | 0.820 | 0.823 | 0.815 | 0.818 | 0.800 | 0.734 |
| Magnetic powder B | | | | | | |

TABLE-continued

| Polymer No. | I | II | III | IV | V | VI |
|---|---|---|---|---|---|---|
| Surface gloss, % | 93 | 92 | 90 | 91 | 88 | 2 |
| Br, gauss | 1650 | 1640 | 1620 | 1630 | 1510 | 1390 |
| Squarenes ratio | 0.829 | 0.819 | 0.810 | 0.813 | 0.754 | 0.695 |
| Magnetic powder C | | | | | | |
| Surface gloss, % | 100 | 90 | 85 | 90 | 43 | 2 |
| Br, gauss | 1620 | 1630 | 1610 | 1620 | 1400 | 1380 |
| Squarenes ratio | 0.812 | 0.816 | 0.806 | 0.810 | 0.722 | 0.690 |

Figure 2:
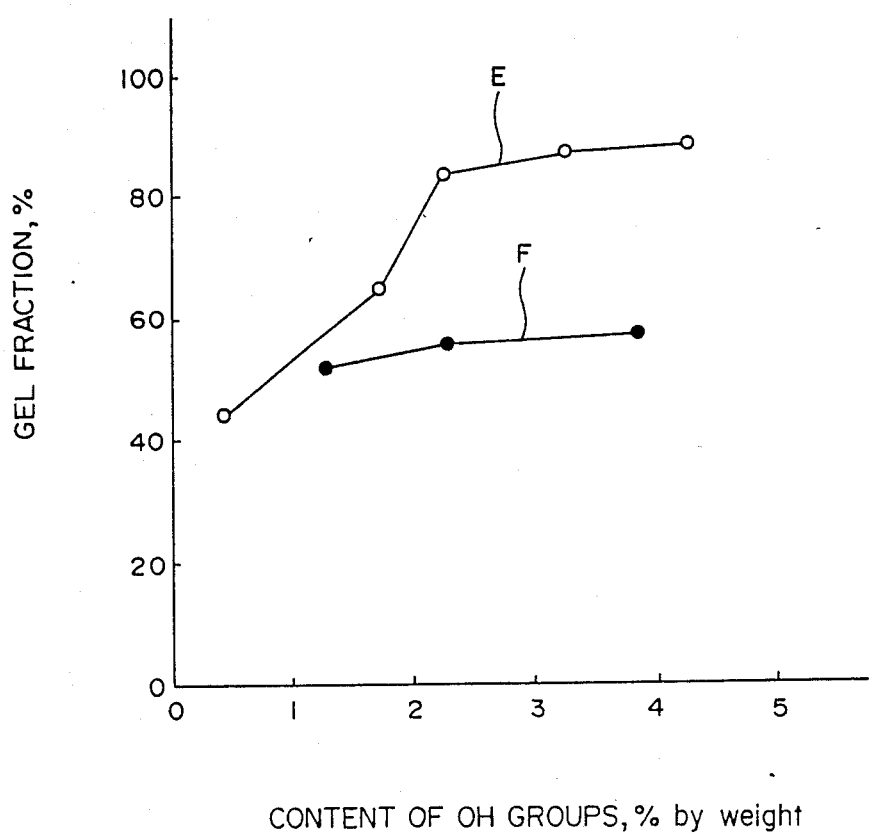
FIG. 2 shows the gel fraction in the copolymeric resins prepared in Example 1 (curve E) and Comparative Example 1 (curve F) as a function of the content of the hydroxy groups, which was varied either by varying the amount of vinyl acetate in Example 1 or by varying the amount of 2-hydroxyethyl methacrylate in Comparative Example 1 in the monomer mixture for the copolymerization.

Further, comparative experiments were undertaken to show the effect of the content of hydroxy groups in the polymeric resins on the gel fraction in the isocyanate-crosslinked polymers. Thus, four more polymeric resins were prepared each in the same formulation as in Example 1 excepting some decrease in the amount of vinyl acetate in the monomer mixture to be copolymerized. In addition, two more polymeric resins were prepared each in the same formulation as in Comparative Example 1 excepting some decrease in the amount of 2-hydroxyethyl methacrylate in the monomer mixture to be copolymerized. Each of these additionally prepared polymeric resins was subjected to the evaluation of the crosslinkability by measuring the gel fraction in the same manner as described above to give the results graphically shown in FIG. 2 as a function of the content of the hydroxy groups in % by weight. The curve E is for the Polymer I and the four additional polymers and the curve F is for the Polymer V and the two additional polymers. As is understood from these results, the increase in the content of the hydroxy groups in the form of the vinyl alcohol moiety in the polymeric resin is effective to increase the gel fraction or to enhance the crosslinkability of the polymeric resin by the reaction with the isocyanate prepolymer, which is a factor favorable for preventing powder falling from the magnetic coating layer of the recording tapes. In contrast thereto, the increase in the content of the hydroxy groups is less effective to enhance the crosslinkability of the polymeric resin when the hydroxy groups are introduced into the polymeric resin not in the form of the vinyl alcohol moiety but in the form of the 2-hydroxyethyl methacrylate moiety.

What is claimed is:

1. A magnetic coating composition for a magnetic recording medium which consists essentially of as dissolved or dispersed in an organic solvent:
   (A) a copolymeric resin which is composed of the following monomeric moieties:
      (a) from 65 to 95% by weight of a first monomeric moiety of vinyl chloride of the formula —$CH_2$—CHCl—;
      (b) from 3 to 15% by weight of a second monomeric moiety of vinyl alcohol of the formula —$CH_2$—CHOH—;
      (c) from 1 to 10% by weight of a third monomeric moiety having an epoxy group; and
      (d) from 0.1 to 5% by weight of a fourth monomeric moiety having a sulfonic acid group —$SO_3H$ or a metal salt thereof;
   (B) particles of a ferromagnetic material dispersed in the copolymeric resin as a vehicle; and
   (C) an isocyanate compound in an amount sufficient to cure the copolymeric resin as the component (A).

2. The magnetic coating composition for a magnetic recording medium as claimed in claim 1 wherein the copolymeric resin as the component (A) further comprises:
(e) up to 5% by weight of a fifth monomeric moiety of vinyl acetate of the formula $-CH_2-CH(O-CO-CH_3)-$.

3. The magnetic coating composition for a magnetic recording medium as claimed in claim 1 wherein the copolymeric resin as the component (A) has an average degree of polymerization in the range from 200 to 800.

4. The magnetic coating composition for a magnetic recording medium as claimed in claim 1 wherein the amount of the copolymeric resin as the component (A) is in the range from 8 to 30 parts by weight per 100 parts by weight of the particles of a ferromagnetic material as the component (B).

5. The magnetic coating composition of claim 1 wherein the third monomeric moiety is allyl glycidyl ether and the fourth monomeric moiety has the formula $CH_2=CH-SO_3X$, wherein X is hydrogen or an alkali metal.

* * * * *